United States Patent Office 3,531,080
Patented Sept. 29, 1970

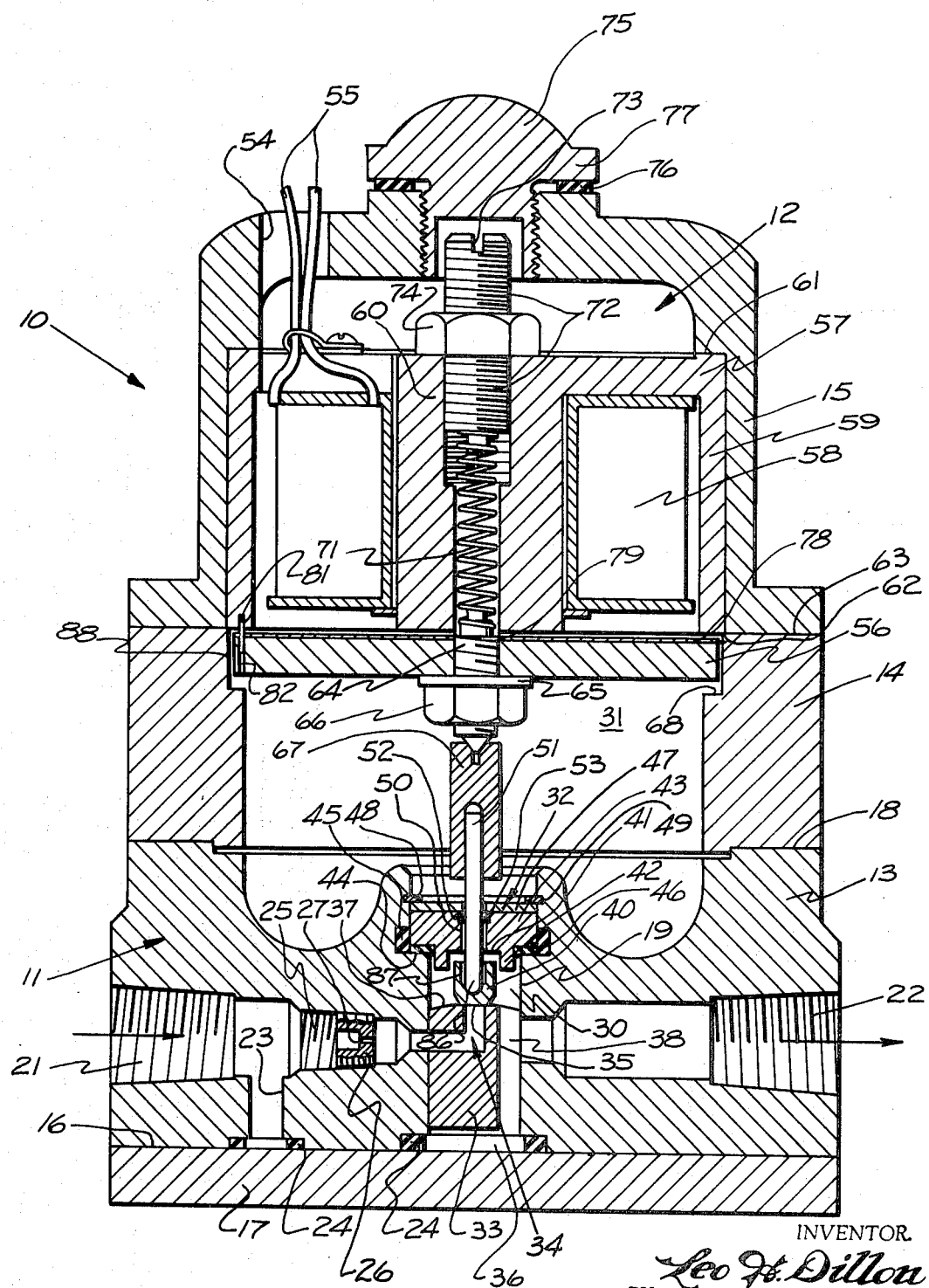

3,531,080
CONTROL VALVE
Leo H. Dillon, Columbus, Ohio, assignor to Abex Corporation, New York, N.Y., a corporation of Delaware
Filed May 7, 1968, Ser. No. 727,204
Int. Cl. F16k 31/06
U.S. Cl. 251—129                                4 Claims

ABSTRACT OF THE DISCLOSURE

A failsafe or normally closed electromagnetically operated control valve for use in a fluid system. The valve is closed when no current is applied to the valve electromagnet and the pressure does not exceed a limiting or maximum relief value determined by a spring which biases the valve closed. The valve can be electrically adjusted to maintain a desired limiting pressure less than the maximum determined by the spring. The poppet type valve abuts and is centered by the armature, but is not positively connected to it.

---

This invention relates to control valves for pressure fluids. More particularly, this invention relates to a control valve of the pressure release type.

The control valve of this invention is related to the electric and fluid pressure operated valve mechanism disclosed in U.S. Pat. 3,250,293. The valve mechanism shown there permits electrical adjustment or control of the pressure setting at which the valve is operable. The pressure setting of that valve is maintained solely by a continuous electric current applied from an adjustable current source to an electromechanical transducer associated with the valve. The fluid pressure controlled by the valve is proportional to the value of the current input into the electromechanical transducer.

The valve mechanism of U.S. Pat. 3,250,293 provides a high degree of nimbleness and flexibility in control of pressure in a fluid circuit, because the electrical control of the valve itself permits the setting of the valve to be adjusted from a remote position, for example, at a control panel some distance from the valve.

In the valve mechanism as disclosed in U.S. Pat. 3,250,293, the mechanical force created by the current input to the electromechanical transducer is opposed by the hydraulic or fluid force in the fluid circuit during operational use of the valve mechanism. The mechanical force is directed toward closing the valve and the hydraulic force is directed toward opening the valve. Thus, the only force opposing the hydraulic force and, hence, the only force directed toward closing the valve, is the mechanical force which varies with and depends solely on the current input into the electromechanical transducer. This means that for the valve mechanism to operate effectively there must be current available to control the electromechanical transducer at all times. If no current is available, no mechanical force is generated by the transducer to oppose the hydraulic force and, hence, no force is available for closing the valve.

Although the value mechanism disclosed in U.S. Pat. 3,250,293 is highly useful under a variety of operating circumstances, there are certain operating conditions under which it cannot carry out its function, or can do so relatively ineffectively. One such operating condition is, of course, when current input for the electromechanical transducer is not available, for example, under power failure conditions. When this situation occurs the valve mechanism looses its effectiveness as a control valve because there is no mechanical force urging the valve closed to oppose the hydraulic force urging the valve open.

The control valve of this invention is also an electric and fluid pressure operated valve mechanism, but is in contrast to that disclosed in U.S. Pat. 3,250,293. Under electrical power loss, the control valve of this invention will remain operative so that the fluid system in which it is placed can continue to function. Thus, an advantage of the control valve of this invention over that valve mechanism disclosed in U.S. Pat. 3,250,293 is that even if current input failure is experienced, pressure is still maintained within safe limits in the system or circuit in which the control valve is situated.

In addition, because the control valve of this invention is closed under no current input conditions, there is no current drain imposed on the electrical system when the valve is operated at its maximum pressure relief valve. That is, the valve of this invention is maintained in the closed position by a constant, maximum mechanical force when no current is available or is applied. In operation, the spring force can be bucked or opposed by force generated through a current applied to the transducer, thereby providing pressure relief values less than the maximum at which the valve can be operated. In contrast, with the control valve mechanism of U.S. Pat. 3,250,293 maximum current is required to operate the valve mechanism at its maximum pressure relief value and, therefore, when that valve mechanism is operated at maximum pressure a substantial current drain is imposed by the electromechanical transducer.

Thus, one objective of this invention has been to provide an electrically operated, sensitive control valve which is capable of maintaining its operative functions in a fluid system even under power failure or no current conditions.

Another objective of this invention has been to provide a control valve having means for electrically varying the valve's pressure setting that, at the maximum pressure setting, requires no current from the electrical system associated with the valve.

In accomplishing these objectives, this invention provides a control valve for use in a fluid system comprising, in preferred form, (1) a valve comprising a body having a main bore, a fixed seat defining a port positioned axially in said main bore, an inlet communicating with one side of said port, said inlet including a flow restrictor, a poppet movable axially with respect to the other side of said port, said poppet having a flat endwise surface thereon which forms a poppet valve with a flat surface on said seat surrounding said port, and an outlet communicating with the other side of said port, and (2) a transducer positioned in the valve body comprising electromagnet means, a spring mounted to urge said poppet toward said port, an armature cooperating with said electromagnet means to oppose the urging of said spring, fluid pressure at said port and force of said electromagnet on said armature each tending to open said poppet valve, said spring tending to close said poppet valve.

Other objectives and advantages will be more apparent from the following detailed description taken in conjunction with the drawing which illustrates an axial section of a valve mechanism that includes the features of this invention.

The preferred control valve mechanism 10 of this invention illustrated in the accompanying figure includes a valve assembly 11 and an electromechanical transducer assembly 12 contained within a common body or casing comprised of three main body elements 13, 14 and 15. The body element 13 is attached to the body element 14 and the body element 14 is attached to the body element 15 by screws (not shown).

The body element 13 includes a flat, generally circular bottom surface 16 adapted to mate with a seal plate 17, and a top surface for engaging and sealing with the bottom surface 18 of body element 14. The body element 13 is provided with a stepped central or main bore 19, the axis of which is aligned with the axis of body elements 14 and 15. The main bore 19 is joined at spaced points by a horizontally extending inlet or bore 21 and an outlet or bore 22. The inlet bore 21 is connected with a passageway 23 transverse to it. Both the main bore 19 and the passageway 23 extend to the bottom 16 of body element 13 where they are closed by seal plate 17 and O-rings 24; they may, of course, be interconnected with a main valve or other valve structure depending on the use and operating attitude for the control valve of this invention.

The inlet 21 and outlet 22 bores are threaded to receive suitable fluid line couplings, not shown. Inlet bore 21 is also threaded between the passageway 23 and the main bore 19, as at 25. This threaded section 25 of inlet bore 21 receives a plug 26 that includes a restricted orifice 27. This orifice damps rapid fluid pressure changes that may occur in the system, to prevent them from damaging the valve mechanism. The orifice 27 also restricts the rate of flow through the valve when the latter is open.

A wet chamber 30 and a dry chamber 31 are defined in bore 19, the wet chamber being separated from the dry chamber by a seal and guide assembly 32. A cylindrical valve seat insert 33 is pressed into and secured in that portion of the stepped bore 19 which cooperates in forming the wet chamber 30. The valve seat 33 is provided with a right angled passageway 34 formed by two intersecting bores which connect the inlet bore 21 with the wet chamber 30. The valve seat 33 is provided with a right angled passageway 34 formed by two intersecting bores which connect the inlet bore 21 with the wet chamber. The valve seat insert 33 also includes a flow conducting slot or groove 38 which extends axially along its side to interconnect the wet chamber 30 with the outlet bore 22. (Slot 38 may also connect the wet chamber with a counterbore 36 of bore 19.)

The upper end of the valve seat 33 has a flat surface 37 which surrounds port 35. The flat portion 37 forms a valve seat against which the flat bottom surface of a cup-shaped valve element or poppet 40 is urged. Thus, the poppet 40 and port 35 in valve seat 33 cooperate to provide a poppet valve.

The poppet 40 is positioned within the wet chamber 30 and its upper end fits loosely within an inverted cup 41 formed in part by a cylindrical wall 42 extending from the lower or bottom side of the seal and guide assembly 32. The radial and axial clearance between the poppet 40 and the inverted cup 41 on the seal and guide assembly 32 permits the poppet to move away from the valve seat surface 37, and the side walls 42 of the inverted cup do not contact the side walls of the poppet.

The seal and guide assembly 32 includes a circular disk 43 having a cylindrical outer wall and this disk is inserted against a shoulder 44 in bore 19 which shoulder is adjacent the upper end of the wet chamber 30. An O-ring seal 45 contained within an annular groove 46 in the bore 19 adjacent the shoulder 44 engages the cylindrical outer wall of the disk 43 and seals it to the bore. The disk 43 is retained against axial movement in the bore 19 by a washer 47 and a snap ring 48, the latter being seated in an annular groove 49 in the wall of the bore 19.

The disk 43 is provided with an axial hole 50 through which extends an operating rod 51 for the valve formed by the poppet 40 and port 35. This central hole 50 is provided with a groove 52 adjacent its top in which an O-ring 53 is inserted. This O-ring 53 is held in the groove by the bottom surface of the washer 47. The rod 51 does not contact either the disk 43 or the washer 47 as it passes through them, and is centered solely by the O-ring 53. By this means the rod 51 is sealed and guided in a substantially frictionless manner. In the preferred embodiment shown, the axial motion of rod 51 may be as great as $3/64$ inch and the O-ring 53 forms an anti-friction bearing since it tends to roll upon the rod 51 as the latter is reciprocated. It is possible to obtain greater axial motion of rod 51 by designing the structure so it will accommodate greater clearance.

From the foregoing, it will be seen that the seal and guide assembly 32 establishes separation between the two chambers 30, 31. The upper end of the dry chamber 31 receives an armature 56 to be subsequently described. The lower end of the wet chamber 30 is defined by valve seat surface 37.

It will be seen that the cup-shaped poppet 40 is provided with a semi-spherical socket 86 in which the semi-spherical end of rod 51 seats, and that the interior side walls 87 of the cup-shaped element are spaced from the rod 51 a distance sufficient to permit the poppet to pivot or swivel about the end of the rod. This pivotal or swivel type connection between the rod 51 and the poppet 40 insures that the flat bottom of the poppet can and will seat properly upon the flat valve seat surface 37 even though there may be small manufacturing errors in the alignment, etc. of parts.

The body elements 14, 15 are cast of non-magnetic material such as aluminum and they substantially house the transducer assembly 12. The body element 15 is bored to receive electromagnet means that includes a fixed ferromagnetic core 57 on which electric coil 58 is carried. The coil 58 is provided with lead wires 55 extending out of body element 15 through an opening 54. The lead wires 55 electrically interconnect the coil 58 with suitable control means, not shown, which can vary the current input to the coil. The core 57 and the armature 56, which is positioned below the core, are preferably formed of material which has high magnetic permeability and low hysteresis characteristics. In one embodiment of the invention an ingot iron is employed to form both the armature 56 and core 57 and after they are formed they are annealed or heat treated in a reducing atmosphere.

The core 57 is a cup-shaped cylinder having a side wall 59 and a hollow center post 60 which acts as the pole pieces. The coil 58 is embedded in an insulating plastic material and is positioned in the core 57 on center post 60, abutting the end wall of the core and closely adjacent the side wall 59 thereof. The outside diameter of the core 57 establishes a close slidable fit with the bore in the body element 15 and the wall 59 thereof abuts shoulder 61 in that bore. The core 57 is retained in position relative to body element 15 through cooperation with an offset 62 provided at interface 63 of body elements 14 and 15.

The electromagnet above described, including the core 57 and coil 58, operates the plate- or disk-shaped armature 56. Armature 56 extends over the magnetic pole formed by the side wall 59 and over the pole formed by center post 60. The armature 56 is threaded to a stub shaft 64 and held thereon by washer 65 and nut 66, the stub shaft being of non-magnetic material. The armature 56 is dimensioned so its periphery does not contact the body element 14. Axial movement of the armature 56 away from the core 57 is limited by ledge 68 in the bore of body element 14.

A spacer or coupler 67 is provided between rod 51 and stub shaft 64. While rod 51 is fitted snugly to coupler 67, it will be noted that the coupler abuts but is not positively connected to stub shaft 64; thus, the coupler limits the axial movement of rod 51 toward armature 56 and spring 71. A self-seating and aligning socket is provided between the shaft and coupler. The stub shaft 64 and armature 56 are acted upon by non-magnetic compression spring 71 which biases them toward coupler 67 and poppet 40. The end of spring 71 remote from armature 56 abuts a fixed surface of an adjustable stop 72 which is formed of non-magnetic material and threaded in center post 60 of core 57. Stop 72 is provided with a screw driver slot 73 that permits adjustment of the compression force exerted by the spring 71. A non-magnetic lock nut 74 is provided to maintain the stop in its set and preselected position. A plug 75 is threaded into the top of body element 15, a seal 76 being provided between body element 15 and the plug's flange 77, to provide access for the adjusting stop 72.

The spring 71 should have a force which can be balanced by the opposed magnetic force developed by the electro-magnet, so that the net closing force on poppet 40 can be varied up to the maximum established by the spring, by varying the current input to the coil 58. The net mechanical force controls the pressure at which fluid pressure will open port 35.

The armature 56 is supported against lateral movement by the enlarged bore 88 in housing member 14. The spacer 78 prevents the armature 56 from closing on the poles; that is, it maintains a minimum gap. Spacer 78 is provided with a central opening 79 which fits loosely around the stub shaft 64 and does not abut the wall of bore 88 in housing 14. Rotation of the spacer 78 and the armature 56 with respect to the core 57 is prevented by a non-magnetic pin 81 which extends into the core side wall 59 and armature 56 through the spacer 78. The pin 81 is fixed in the core side wall 59 but extends into an opening 82 in the armature 56 of a diameter larger than that of the pin 81 so if the armature 56 contacts the pin 81 during operation there will be minimal frictional resistance between them. The pin 81 also holds armature 56 against rotation during adjustment of stop 72.

The valve mechanism 10 described above can function as a relief type control valve. For this purpose inlet bore 21 is connected to a conduit in which fluid pressure is to be controlled and outlet bore 22 is connected to a drain or other lower pressure line. The poppet valve 33, 40 thus controls fluid flow through the port 35.

Fluid flowing through port 35, enters the wet chamber 30 and flows to the outlet bore 22 through the groove 38. The poppet 40 is continuously urged toward surface 37 of the valve seat 33 by compression spring 71 so that the valve is normally closed, that is, when the electromagnet is not energized and pressure is below the value required to overcome the force of spring 71. When the electromagnet is energized, armature 56 opposes or breaks the force exerted by the spring 71 since it is drawn toward the electromagnet. Thus, the fluid pressure force in inlet bore 21 required to lift poppet 40 from its seat 33 is determined by the valve closing spring force which is substantially constant under usual operating conditions, minus the valve opening magnetic force. For a given compression spring 71 setting, as determined by the position of stop 72, the pressure relief is controlled by the electromagnet current; and this range can be changed by adjustment of stop 72 to exert more or less compression on the spring 71.

By this apparatus the mechanical force exerted on the poppet 40 and urging the poppet valve closed can be varied from (a) a maximum determined by the compression of spring 71 when there is no electromagnet current, through (b) a pressure relief range determined by the compression spring 71 force minus the electromagnet force, to (c) a minimum force which may be essentially zero, when the electromagnet force substantially balances the spring force.

The fact that the valve is at its maximum pressure relief setting at no current condition is highly advantageous for some purposes and in certain types of installations. An operating pressure relief system is maintained even under power failure conditions, because the poppet valve is always urged toward the closed position by compression spring 71. Hence, loss of electrical power does not result in loss of pressure relief capability, and the hydraulic system may continue to function. Also, when the valve is to be operated for a prolonged period at maximum pressure conditions, it draws no current from the power source because the maximum pressure is established in the absence of current.

Alternatively, when the control is operated at pressure relief values less than the maximum, changing the input permits a desired pressure to be maintained. When the fluid pressure on the bottom of the poppet 40 overcomes the total mechanical force generated by the transducer to close the valve, the poppet valve will be opened the extent necessary to relieve the excess pressure. Once the excess pressure is relieved the poppet valve again returns to a closed or more closed position.

Having described the preferred embodiment of my invention, what I desire to claim and protect by Letters Patent is:

1. A control valve for use in a fluid system comprising, in combination,
   (1) a valve comprising a body having a bore, a fixed seat defining a port positioned axially in said bore, an inlet communicating with one side of said port, said inlet including a flow restrictor, a poppet movable axially with respect to the other side of said port, said poppet having a flat endwise surface portion thereon which forms a poppet valve with a flat surface portion on said seat surrounding said port, and an outlet communicating with the other side of said port, and
   (2) a transducer in the valve body and comprising an electromagnet, a spring mounted to urge said poppet toward said port, an armature cooperating with said electromagnet to oppose the urging of said spring on said poppet, fluid pressure at said port and force of said electromagnet on said armature each tending to open said poppet valve, said spring tending to close said poppet valve, said poppet being carried by a rod supported for axial movement, said rod abutting but not rigidly connected to said armature.

2. A control valve as set forth in claim 1 wherein said spring is a compression spring and said transducer includes an adjustable stop providing a fixed surface against which bears an end of said spring remote from said armature, the compression force of said spring being regulatable by adjusting the position of said stop.

3. A control valve as set forth in claim 1 wherein said transducer includes an axially movable shaft operated by said armature, said shaft having means which are self-aligning with an axial socket associated with said rod, said shaft being axially movable in relation to said rod and poppet but pushing the rod in abutting relation under influence of said spring.

4. A control valve in accordance with claim 1 which further includes means guiding said armature for axial movement, and wherein said rod abuts said armature through a self-seating and aligning socket.

References Cited

UNITED STATES PATENTS

| 1,902,027 | 3/1933 | Henkel | 251—129 |
| 3,250,293 | 5/1966 | Adams et al. | 137—489 X |

FOREIGN PATENTS

| 1,053,629 | 9/1953 | France. |
| 471,427 | 9/1937 | Great Britain. |

ARNOLD ROSENTHAL, Primary Examiner